April 8, 1947.                M. J. STEFFES                2,418,734
                               TOOL HOLDER
                           Filed Aug. 2, 1945
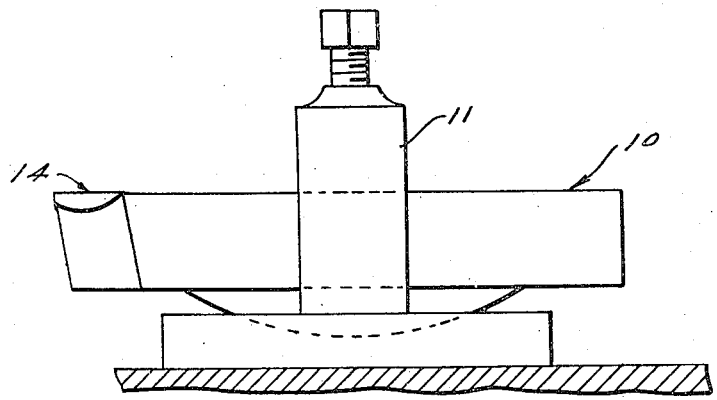
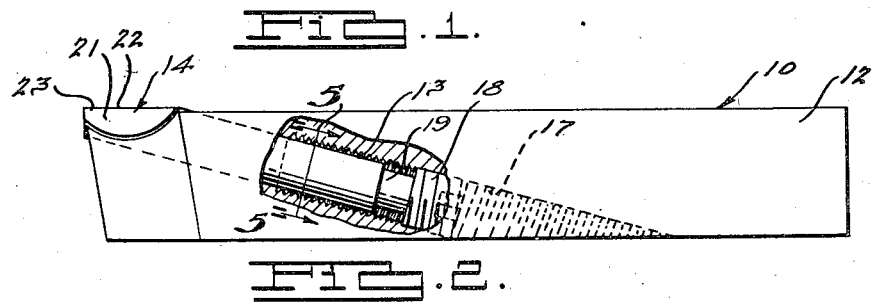
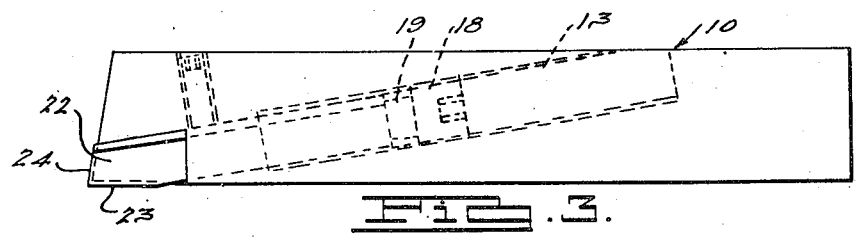
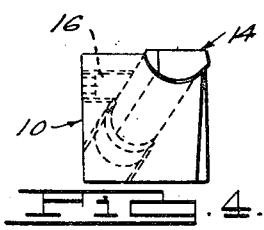
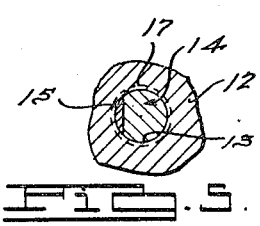
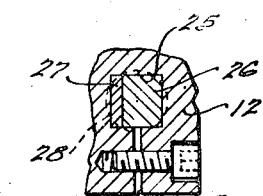
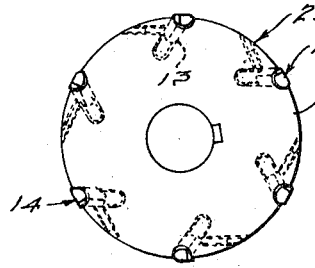
INVENTOR.
Milton J. Steffes.
BY
Harness, Dickey & Pierce.
ATTORNEYS.

Patented Apr. 8, 1947

2,418,734

UNITED STATES PATENT OFFICE 2,418,734

TOOL HOLDER

Milton J. Steffes, Dearborn, Mich., assignor to Super Tool Company, Macomb County, Mich., a partnership Application August 2, 1945, Serial No. 608,522

5 Claims. (Cl. 29—96)

This invention relates to adjustable tools, and particularly to a tool comprising a body portion having a bit containing an end and two side faces which are advanced outwardly when the bit is shifted longitudinally in an aperture in the body portion.

It has been the practice in the past to braze a tip of hard material on a cutting tool shank which is supported on a tool post of the lathe for adjustment relative to the work thereon. The present invention contemplates the use of an inserted bit in a tool body disposed at an angle to the axis of the body both in a vertical and horizontal plane to have the end and side faces thereof advance in three planes shifted longitudinally outwardly of the body so that the faces may all be dressed to reproduce the cutting edge. The inserted bit may be made of any material known to be suitable, such as tungsten carbide, Stellite and the like.

A cylindrical aperture may be drilled in the tool body for receiving the tool bit which is round or which is preferably D-shape to have a flat surface against which a clamping plate made of soft material, such as brass, is clamped by a suitable set screw disposed in the tool body. The aperture is threaded to receive an adjusting screw which is advanced against a disk of brass or similar material to shift the bit within the aperture and to prevent it from moving in the tool body after being clamped in position.

The projecting end of the bit is machined in the usual manner to provide relief and rake to the cutting edge. When the edge becomes dull the clamping screw is loosened and the backing-up screw is adjusted to advance the bit from the end of the body where it is retained in position by the securing plate when the clamping screw is again tightened. The end and two side faces of the bit which were advanced outwardly may then be dressed to their original position to sharpen the cutting edge and to provide the relief thereto in the customary manner. Preferably the aperture in the body is broached to form a square hole and the tool bit is of square or rectangular section to fit within the broached hole where it is prevented from turning within the body. Threaded sections in the flat faces forming the walls of the aperture support the adjusting screw which is advanced therein to shift the bit and to back it up thereafter.

Accordingly, the main objects of the invention are: to form a tool from a body member which is adjustably supported in a tool post of a lathe, or like machine, having therein a tool bit which has its end and two side faces advanced into parallel planes when shifted outwardly of the body member; to provide an aperture in a body member at an angle both to a horizontal and a vertical plane in which it is shifted by a screw which is adjustable within the aperture and secured by a clamping plate which is forced against one side of the bit; to provide a broached aperture in a tool body at an angle both to the vertical and horizontal plane in which a square or rectangular blade and a clamping plate are advanced by a screw in engagement with threads in the walls of the aperture and clamped in adjusted position by a suitable set screw forced against the clamping plate; to form a tool body with a plurality of apertures disposed at an angle to horizontal and vertical planes in which tool bits are advanced to have the end and two side faces shifted outwardly before a dressing operation so the cutting edges may be maintained in the same position; and, in general, to form a tool from a body portion containing an adjustable bit which positively retains the bit in position and which is economical of manufacture and use.

Other objects and features of novelty of the invention will be specifically pointed out or will become apparent when referring, for a better understanding of the invention, to the following description taken in conjunction with the accompanying drawing, wherein:

Figure 1 is a view in elevation of a tool having a tool body containing a cutting bit embodying features of this invention;

Fig. 2 is an enlarged broken view of the tool illustrated in Fig. 1;

Fig. 3 is a plan view of the tool illustrated in Fig. 2;

Fig. 4 is an end view of the tool illustrated in Fig. 2;

Fig. 5 is a sectional view of the structure illustrated in Fig. 2, taken on the line 5—5 thereof;

Fig. 6 is a view of the structure, similar to that illustrated in Fig. 5, showing a further form of the invention, and Fig. 7 is a plan view of a milling tool showing a further form which the invention may assume.

Referring to Figs. 1 to 5, a tool 10 is illustrated as being mounted in a tool post 11 of a lathe or similar cutting machine wherein it may be adjusted in predetermined relation to the workpiece to be machined. The tool 10 comprises a body member 12 having an aperture 13 therein disposed at an angle to the longitudinal length of the body member, both in a horizontal and vertical plane, as illustrated in Figs. 2 and 3. The aperture 13 is cylindrical in form for receiving a tool bit 14 which is D-shape in section, as illustrated in Fig. 5. An arcuate clamping plate 15 abuts the flat face of the tool to complete a cylindrical shape therewith. A set screw 16 in the body member 12 is screwed against the clamping plate 15 which is forced against the tool bit 14 for retaining it in adjusted position. A thread 17 is cut on the wall of the aperture 13 for receiving the thread of the adjusting screw 18 which is advanced in the aperture to shift the cutting bit 14 from the cutting end of the body member 12. Between the end of the tool bit 14 and the screw 18, a disk 19 of soft material such as iron, brass, or the like, is disposed to assist in the clamping of the bit within the aperture.

The bit is provided with side faces 21 and 22 which form the cutting edge 23 having a suitable rake and relief as customarily provided. Similarly, an end face 24 is dressed on the end of the bit in the usual manner. When the cutting edge 23 is to be renewed, the set screw 16 is loosened and the screw 18 advanced to shift the end of the bit outwardly of the body member 12. Thereafter the screw 16 is tightened to securely clamp the bit within the body member. The faces 21, 22 and 24 may then be dressed to the position originally had to provide a sharp cutting edge 23 disposed in the position originally occupied before adjustment. The portion of the bit having the cutting edge is backed up by the walls of the notch provided in the forward portion of the body 12 where the aperture 13 breaks out through the top and side faces of the body.

In Fig. 6 an aperture 25 disposed in the body member 12 is illustrated as being square or rectangular in section produced by the operation of a broach which is drawn through the cylindrical aperture 13. The tool bit 26 disposed in the aperture is square or rectangular in cross section which, with a rectangular clamping plate 27, fills the aperture 25. Threads 28 are cut in the walls of the aperture 25 for receiving the threads of the advancing screw 18. The square or rectangular aperture prevents the tool bit from turning therein when the plate 27 and bit 26 are in clamped adjusted position. A slot 30 is provided in the forward end of the body member 12 communicating with the aperture 25. The parts each side of the slot are drawn together by a screw to clamp the bit 26 in position. It is to be understood that the slot 30 and screw may be employed in place of the screw 16 in the structure illustrated in the other figures.

In Fig. 7 a further extension of the invention is illustrated, that wherein a milling tool 29 is formed by applying to the tool body member 31 a plurality of apertures 13 or 25, as the case may be, which are disposed at an angle to the axes and radial planes of the body so that the tool bits 14 or 26 disposed therein may be adjusted to have all three faces 21, 22 and 24 projected outwardly so that when dressed the faces and the cutting edge will be disposed in the same position as they occupied before the adjustment and dressing operations.

It was found in practice that a substantial saving was had when employing a bit of hard material in a body member in the manner herein described and illustrated over the use of other tools such as those having tips which were brazed on the body member. As soon as the cutting portion or tip was destroyed by being broken or otherwise damaged, the tool was useless, while in the present tool the bit is advanced an amount sufficient to permit the broken or damaged portion to be dressed so as to return the tool to its original form.

What is claimed is:

1. A bit holder comprising an elongated body member having a top, bottom and side faces and a forward and rear end, and having an aperture therein extending along the lonigtudinal dimension from the junction of a side and top face downwardly toward the bottom face and transversely toward the other side face and breaking out through said body member rearwardly of the forward end, and a thread in said aperture adjacent to the point where said aperture breaks out through said body member, said body member having a slot in its forward end communicating with said aperture, said body member also having a threaded aperture extending through said slot for receiving a screw by which a bit is clamped in said first aperture when disposed therein.

2. A bit holder comprising an elongated body member having a top, bottom and side faces and a forward and rear end, and having an aperture therein extending along the longitudinal dimension from the junction of a side and top face downwardly toward the bottom face and transversely toward the other side face and breaking out through said body member rearwardly of the forward end, said aperture at the forward end of the body member breaking out of the top and one side face to provide a notch in the forward end of the body member upon which a bit may rest with its cutting edge exposed, and clamping means for securing a bit in said aperture.

3. A bit holder comprising an elongated body member having a top, bottom and side faces and a forward and rear end, and having an aperture therein extending along the longitudinal dimension from the junction of a side and top face downwardly toward the bottom face and transversely toward the other side face and breaking out through said body member rearwardly of the forward end, said aperture at the forward end of the body member breaking out of the top and one side face to provide a notch in the forward end of the body member, and clamping means for securing a bit in said aperture, the forward end of the body member at the notched portion having the side and end faces relieved downwardly from the top face.

4. A tool comprising an elongated body member having a top, bottom and side faces and a forward and rear end, and having an aperture therein extending along the longitudinal dimension from the junction of a side and top face downwardly toward the bottom face and transversely toward the other side face and breaking out through said body member rearwardly of the forward end, a bit in said aperture, a thread in said aperture adjacent to the point where said aperture breaks out through said body member, a screw in said aperture engaging said thread for backing up said bit, and a screw in said body member by which said bit is clamped in said aperture.

5. A tool comprising a body portion having an aperture extending therethrough at such an angle as to break out of the body portion where the cutting is to occur, with the portion of the holder projecting therebeyond containing the remaining portion of the aperture in the form of a notch, a bit in said aperture having the portion projecting from the aperture resting in said notch to be backed up by the walls thereof, the body portion containing a slot which communicates with said aperture, a screw extending through said body portion and said slot for clamping the bit in the aperture, and means in said aperture for backing up said bit.

MILTON J. STEFFES.

REFERENCES CITED

The following references are of record in the file of this patent:

UNITED STATES PATENTS

| Number | Name | Date |
| --- | --- | --- |
| 2,360,137 | Jennings | Oct. 10, 1944 |
| 2,096,137 | Shaw | Oct. 19, 1937 |
| 1,779,059 | Burkart et al. | Oct. 21, 1930 |
| 2,309,409 | Miller | Jan. 26, 1943 |

FOREIGN PATENTS

| Number | Country | Date |
| --- | --- | --- |
| 117,469 | Australia | Sept. 3, 1943 |